(12) United States Patent
Zimmermann (10) Patent No.: US 9,092,036 B2
(45) Date of Patent: Jul. 28, 2015

(54) PRESSURE REGULATOR ASSEMBLY

(75) Inventor: Joerg Zimmermann, Vancouver (CA)

(73) Assignee: Intelligent Energy Limited, Leicestershire (GB)

( * ) Notice: Subject to any disclaimer, the term of this patent is extended or adjusted under 35 U.S.C. 154(b) by 0 days.

(21) Appl. No.: 13/640,398

(22) PCT Filed: Apr. 15, 2011

(86) PCT No.: PCT/CA2011/050204
§ 371 (c)(1),
(2), (4) Date: Oct. 10, 2012

(87) PCT Pub. No.: WO2011/127608
PCT Pub. Date: Oct. 20, 2011

(65) Prior Publication Data
US 2013/0025710 A1 Jan. 31, 2013

Related U.S. Application Data

(60) Provisional application No. 61/325,143, filed on Apr. 16, 2010.

(51) Int. Cl.
*F16K 31/12* (2006.01)
*G05D 16/06* (2006.01)
*H01M 8/04* (2006.01)

(52) U.S. Cl.
CPC ....... *G05D 16/0658* (2013.01); *H01M 8/04201* (2013.01); *Y02E 60/50* (2013.01)

(58) Field of Classification Search
CPC .......... G05D 16/0611; G05D 16/0636; G05D 16/0658; F16K 31/126; F16K 1/126; F16K 99/0001; F16K 99/0005; F16K 99/0059; F16K 99/0055; F16K 99/0057; F16K 99/0015; F16K 99/0026; H01M 8/04201; Y02E 60/50
USPC .................. 137/505, 505.38, 505.46, 505.26, 137/505.36, 505.22, 505.21, 505.18, 829; 251/61.1, 61.2, 61.4, 62, 63, 363
See application file for complete search history.

(56) References Cited

U.S. PATENT DOCUMENTS

| 997,272 | A | * | 7/1911 | Coleman | 137/505.38 |
| 1,800,352 | A | * | 4/1931 | Klees et al. | 236/84 |
| 2,026,704 | A | * | 1/1936 | Petroe | 137/495 |

(Continued)

FOREIGN PATENT DOCUMENTS

DE 4422943 A1 1/1996

OTHER PUBLICATIONS

Extended European Search Report issued in connection with the corresponding European Patent Application No. EP 11768348 on Sep. 24, 2013.

(Continued)

*Primary Examiner* — Jessica Cahill
(74) *Attorney, Agent, or Firm* — The H.T. Than Law Group (57) ABSTRACT

Pressure regulator assemblies that are overall small in size, have a thin form factor, can be repeatedly manufactured at relatively low cost and which can avoid the use of poppet valves, pivots, sliding members or rubber and metal diaphragms are disclosed. These pressure regulator assemblies can find utility in small or micro-fluidic applications, such as fuel cell systems, for example. The fluid to be regulated by the assemblies can be a liquid or gas.

27 Claims, 6 Drawing Sheets

(56) References Cited

U.S. PATENT DOCUMENTS

| | | | | |
|---|---|---|---|---|
| 2,100,978 | A * | 11/1937 | Rheinlander | 73/199 |
| 2,517,484 | A * | 8/1950 | Henneman | 62/50.7 |
| 2,691,988 | A * | 10/1954 | Weatherhead, Jr. | 137/377 |
| 3,173,446 | A * | 3/1965 | Mitchell | 137/498 |
| 3,485,259 | A | 12/1969 | Ulbing | |
| 3,559,945 | A * | 2/1971 | Coiner et al. | 251/61.2 |
| 3,779,274 | A * | 12/1973 | Kelly | 137/505 |
| 3,837,615 | A * | 9/1974 | Espeel | 251/29 |
| 4,130,266 | A | 12/1978 | Bertling | |
| 4,550,742 | A * | 11/1985 | Stearns | 137/14 |
| 4,794,940 | A * | 1/1989 | Albert et al. | 137/1 |
| 4,924,905 | A * | 5/1990 | Mastromatteo | 137/510 |
| 5,411,056 | A * | 5/1995 | Solaroli | 137/527.4 |
| 6,149,123 | A | 11/2000 | Harris et al. | |
| 6,840,269 | B2 * | 1/2005 | Lee | 137/505.13 |
| 7,341,074 | B2 * | 3/2008 | Pechtold | 137/505.42 |
| 7,607,641 | B1 * | 10/2009 | Yuan | 251/331 |
| 2004/0119038 | A1 * | 6/2004 | Crockett et al. | 251/63.5 |
| 2008/0099081 | A1 * | 5/2008 | Yamamoto | 137/497 |
| 2010/0171054 | A1 | 7/2010 | Stenmark | |

OTHER PUBLICATIONS

Translated Abstract of DE 4422943 A1 to Mettner et al. (submitted Oct. 2013).

International Search Report issued in connection with the corresponding International Application No. PCT/CA2011/050204 on Aug. 3, 2011.

* cited by examiner

PRESSURE REGULATOR ASSEMBLY

CROSS-REFERENCE TO RELATED PATENT DOCUMENTS

This patent application is a U.S. national phase of international patent application Ser. No. PCT/CA2011/050204 filed on 15 Apr. 2011 and claims priority to U.S. provisional application Ser. No. 61/325,143 filed on 16 Apr. 2010. The parent patent applications are incorporated by reference herein in their entireties.

This patent application may be related to one or more of U.S. application Ser. No. 12/053,366, entitled "FLUID MANIFOLD AND METHOD THEREFOR," U.S. application Ser. No. 12/053,374, entitled "FLUIDIC CONTROL SYSTEM AND METHOD OF MANUFACTURE," and U.S. application Ser. No. 12/053,408, entitled "FLUIDIC DISTRIBUTION SYSTEM AND RELATED METHODS," the specifications of which are incorporated herein in their entirety.

TECHNICAL FIELD

This patent document pertains generally to fluid control components. More specifically, but not by way of limitation, this patent document pertains to a pressure regulator assembly for use with a fuel cell system, among other things.

BACKGROUND

Electronic components, such as portable electronic devices, are trending smaller in size while increasing in performance. As electronic components are designed smaller in size and incorporate sophisticated and complex technology, the demands on the associated power source become greater.

One example of a power source is a fuel cell system. Fuel cell power sources used in portable and other small scale power generating applications demand the use of small and compact components (e.g., fluidic pressure regulators, valves, check valves and interface ports), which are configured to maintain high overall system energy densities. Also, the components used within such small or 'micro' fuel cell systems should be manufacturable at low cost to compete with less complex battery power sources. If these components are bulky or require excessive precision in manufacture, then many of the benefits of a fuel cell can be diminished. This is particularly the case for battery replacement applications of fuel cells where volume utilization is at a premium.

In order to make a smaller fuel cell system, various innovative and technical requirements need to be met while attempting to accommodate the reduced space requirements.

OVERVIEW

The present inventor has recognized the need for compact fluid control components, including pressure regulator assemblies, having a small overall size and a thin form factor, which can advantageously be manufactured with a lower need for the precision and corresponding cost required in the manufacture of pressure regulators that include pivots, sliding members, or rubber or metal diaphragms. Embodiments of the present invention can be made smaller, thinner, and at a lower cost than conventional designs. Current component designs include sliding or pivoting members or the use of rubber or metal diaphragms, which have been found to be difficult and expensive to build at a small or micro scale with repeatable functional characteristics.

The present invention provides a pressure regulator assembly. The assembly includes a first chamber. The first chamber is configured to enclose a force-activated valve element. The first chamber is also configured to enclose a fluidic input port. Further, the first chamber is configured to enclose a fluidic output port. The assembly includes a second chamber. The second chamber is configured to enclose the first chamber. The second chamber is in communication with a reference pressure port. The assembly includes a third chamber. The third chamber is configured to enclose the second chamber. The third chamber is configured to enclose a feedback reference port. The force-activated valve element does not extend outside the first chamber.

The present invention provides a method of manufacturing a pressure regulator assembly. The method includes forming or providing a planar fluidic manifold. The manifold includes a fluidic input port. The manifold also includes a fluidic output port. The manifold also includes a reference pressure port. The manifold also includes a feedback input port. The method also includes forming or providing a first chamber. The method also includes forming or providing a second chamber. Further, the method includes forming or providing a third chamber. The method includes placing the first chamber on the manifold. The first chamber is placed on the manifold such that it encloses a force-activated valve element. The first chamber is placed on the manifold such that it also encloses the fluidic input port. The first chamber is placed on the manifold such that it also encloses the fluidic output port. The method includes stacking the second chamber on the manifold. The second chamber is stacked on the manifold such that it encloses the first chamber. The second chamber is stacked on the manifold such that it is in communication with the reference pressure port. The method includes stacking the third chamber on the manifold. The third chamber is stacked on the manifold such that it encloses the second chamber. The third chamber is stacked on the manifold such that it encloses the feedback input port. The method also includes bonding a portion of the chambers to the surface of the planar manifold.

The present invention provides a pressure regulator assembly. The assembly includes a first chamber. The first chamber is configured to enclose a force-activated valve element. The first chamber is also configured to enclose a fluidic input port. Further, the first chamber is configured to enclose a fluidic output port. The assembly includes a second chamber. The second chamber is configured to enclose the first chamber. The second chamber is in communication with a reference pressure port. The assembly includes a third chamber. The third chamber is configured to enclose the second chamber. The third chamber is configured to enclose a feedback reference port. The assembly also includes a force-restraining element. The force-restraining element exerts a force against deflection of the second chamber. The assembly also includes a composite element. The composite element includes the first chamber. The composite element also includes the force-restraining element. The force-activated valve element does not extend outside the first chamber. The pressure in the third chamber, when above a threshold pressure, results in a force being exerted on the second chamber, which causes deflection of the second chamber. The deflection of the second chamber, in turn, causes the first chamber to deflect. Sufficient deflection of the first chamber is configured to close the force-activated valve element. Closing the force-activated valve element impedes a flow of fluid from the fluidic input port to the fluidic output port. Sufficient pressure formed from a flow of fluid through the feedback input port causes the force-activated valve element to move from an open position toward a closed position. The composite element includes at least part of the walls of the second chamber.

These and other examples, advantages, and features of the present assemblies and methods will be set forth in part in the Detailed Description, which follows, and in part will become apparent to those skilled in the art by reference to the following description and drawings or by practice of the same.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Definitions

As used herein, the term "fluid" refers to a liquid or gas, such as gaseous hydrogen, any hydrocarbon such as butane or propane, alcohols such as methanol, formic acid or other liquids such as water, aqueous solutions, and can include any suitable organic solvent. Any fluid can optionally have solutes dissolved therein. In some embodiments, a fluid can include a reformate from any fuel reformation process. For example, a fluid can include hydrogen gas generated by a fossil fuel reforming process, such as hydrogen gas generated by the reformation of natural gas. In another example, a fluid can include hydrogen gas generated by the reformation of methanol, propane, butane, or formic acid. In examples, the reformate is seldom a pure gas, but rather is very rich in a particular gas, e.g. hydrogen, and contains amounts of other gases such as $CO_2$ and CO.

As used herein, the term "Belleville washer" refers to any suitable Belleville washer as known by one of skill in the art, otherwise referred to as a coned-disc spring, conical spring washer, disc spring, Belleville spring, or cupped spring washer. The washer has a frusto-conical shape, e.g. a horizontal slice of any thickness of a vertically-oriented cone, giving the washer a spring characteristic.

As used herein, the term "manifold" refers to any assembly of pipes and channels that allows the directed transport of a fluid. For example, a manifold can include any manifold disclosed in U.S. patent application Ser. No. 12/053,366, entitled "FLUIDIC MANIFOLD AND METHOD THEREFOR,"

Description

Figure 1:
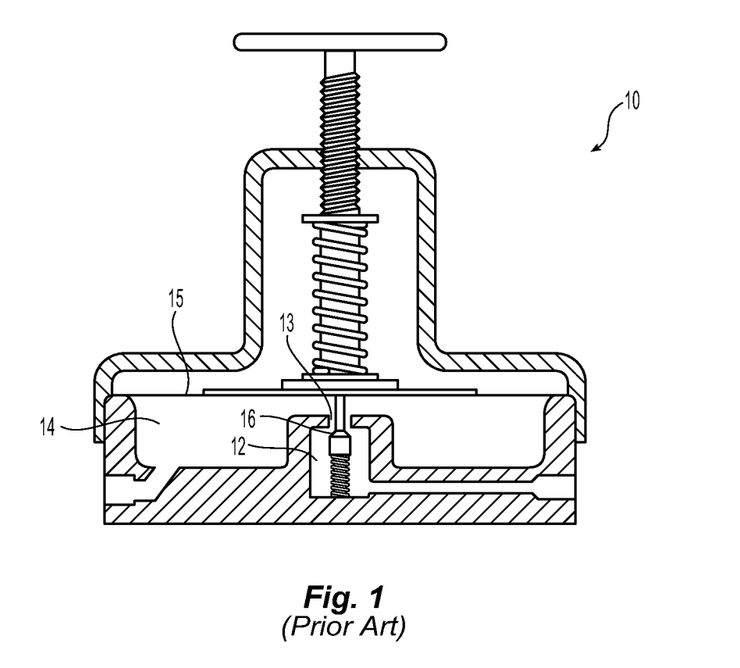
FIG. 1 illustrates a cross-sectional view of a prior art pressure regulator assembly including a movable poppet intersecting a plane between a high pressure region and a low pressure region.

A prior art pressure regulator assembly 10 is shown in FIG. 1. This pressure regulator assembly 10 includes a high pressure inlet region 12 and a low pressure outlet region 14. The two regions 12, 14 are separate, but communicate via an aperture 13, which is filled with a movable 'poppet' 16 that intersects a boundary between the regions and forms a valve. The poppet 16 is a mechanical element that is in contact with a flexible diaphragm wall 15 of the low pressure region 14. In operation, when pressure in the low pressure region 14 is low, force exerted on an outside of the diaphragm wall 15 pushes on the poppet 16 in a relatively downward direction and opens the valve. As high pressure fluid flows from the high pressure region 12 into the low pressure region 14, the pressure in the low pressure region increases, exerting an opposite force on the diaphragm wall 15 from the inside. As pressure continues to build, the point at which the external and internal forces balance is reached, whereupon the poppet 16 is no longer depressed and the valve is sealed preventing any further ingress of fluid from the high pressure region 12 into the low pressure region 14.

By carefully selecting the stiffness of a spring element associated with the poppet 16 and the dimensions of the diaphragm wall 15, the pressure at which the external and internal forces balance can be selected and manipulated as desired. In this pressure regulator assembly 10, the poppet 16 forms the valve and seal element, and as such, requires a degree of rigidity and an integrated fluid tight sealing element.

Figure 2:
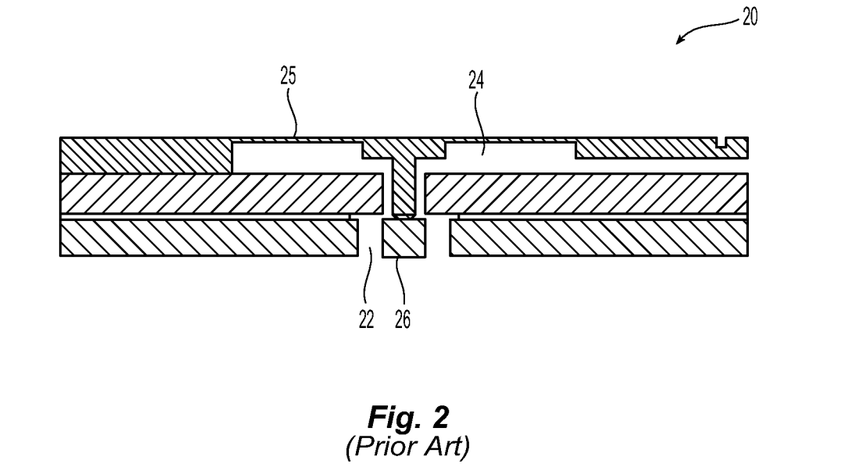
FIG. 2 illustrates a cross-sectional view of another prior art pressure regulator assembly including a movable poppet intersecting a plane between a high pressure region and a low pressure region.

FIG. 2 illustrates another prior art pressure regulator assembly 20. This pressure regulator assembly 20 can be formed using etched or other micro-fabricated layers. Similar to the pressure regulator assembly 10 shown in FIG. 1, assembly 20 includes a poppet 26, connected to a diaphragm 25, and intersecting a plane between a high pressure region 22 and a low pressure region 24. The present inventor has found that construction of pressure regulator assemblies 10, 20 using poppets or poppet-like features extending between high and low pressure regions creates a need for extreme precision in both the poppet formation and the regulator's seal configuration, thereby constraining the regulator assembly designs and methods of manufacture.

FIGS. 3-8 illustrate various pressure regulator assemblies that, unlike the assemblies of FIGS. 1 and 2, have a small overall size, a thin form factor, can be repeatedly manufactured at large scale and at relatively low cost, and can avoid the use of poppet valves, pivots, sliding members or rubber and metal diaphragms. For instance, the pressure regulator assemblies of FIGS. 3-8 can be assembled at a reduced cost, as tolerance-critical components can be limited to the molded or formed components. As a result, assembly alignment tolerances during manufacture can be diminished relative to other regulator assemblies, such as those shown in FIGS. 1 and 2. These pressure regulator assemblies can find utility in small or micro-fluidic applications, such as fuel cell systems, for example. The fluid to be regulated by the assemblies can any fluid as defined herein.

The present pressure regulator assemblies can include various options. In some examples, the assemblies can include components that are molded or formed using an inexpensive manufacturing process. In some examples, polymer materials are used to form the assemblies. In some examples, metal materials are used to form the assemblies. A single sealing element can be used, and the pressure regulator assembly design can be configured to be relatively insensitive to the dimensions chosen for this sealing element. In various examples, no elements of the pressure regulator assemblies are inserted through any boundaries between high and low pressure regions. The regulator assemblies can thus be assembled by stacking and bonding concentric or otherwise arranged elements to form high pressure, low pressure and reference pressure chambers. Each chamber can communicate fluid via a common distribution plenum. Fluid-tight seals can be formed within one plenum.

Figure 3:
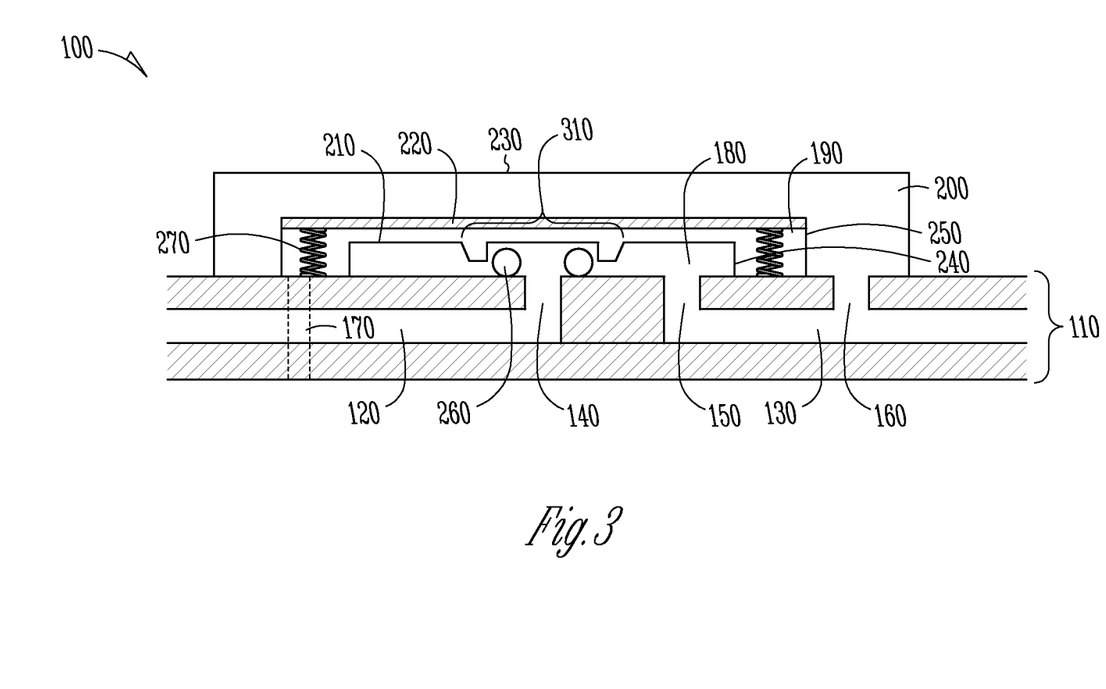
FIG. 3 illustrates a cross-sectional view of portions of a pressure regulator assembly for use in small or micro fluidic applications, as constructed in accordance with at least one embodiment.

FIG. 3 illustrates a schematic cross-sectional view of a pressure regulator assembly 100, as constructed in accordance with at least one embodiment. The pressure regulator assembly 100 can be built on a surface of a planar fluid distribution manifold 110.

In operation, a working pressure regulator has an input at some high pressure and an output at a regulated, lower pressure. FIG. 3 shows conduits and ports that describe the input and output of the regulator assembly 100. Specifically, the fluid manifold 110 can contain a fluid input conduit 120 connecting to a fluid input port 140, and a fluid output conduit 130 connecting to a fluid output port 150 and to an output fluid feedback port 160. These conduits and ports can be built into the fluid distribution manifold 110, which may or may not be included as part of the completed pressure regulator assembly 100.

The pressure regulator assembly 100 can include a plurality of nested chambers, such as three nested chambers (a first chamber 180, a second chamber 190, and a third chamber 200), arranged on a surface of the fluid distribution manifold 110. The fluid distribution manifold 110 can include multiple pathways for fluids at different pressures to be transported from one plenum or region to another. All input and output ports from the chambers in the assembly 100 can be co-planar within the fluid distribution manifold 110.

In the example shown, the perimeter of the first chamber 180 can be bonded to a top or upper surface of the fluid distribution manifold 110 and can enclose the fluid input port 140 and the fluid output port 150. The bond can form a fluid seal around the perimeter of the first chamber 180. A force-activated valve element 260 can be held in place within the first chamber 180 and can either be attached to a relative top surface 210 of the first chamber 180, or can be attached to the bottom of the first chamber 180 but held in place by features embedded within the top surface 210 such as a sealing element retention feature 310 embedded in the first chamber top. Alternative methods of holding the force-activated valve element 260 in place can also be used, such as using features embedded within the fluid distribution manifold 110 to retain the valve element. The first chamber 180 can include flexible chamber walls 240 such that when a sufficient force is exerted on the top of the top surface 210, the first chamber walls 240 can be configured to buckle or deflect, causing the force-activated valve element 260 to become compressed and seal the fluid inlet port 140. This, in turn, can prevent the flow of fluid from the fluid inlet port 140 to the fluid outlet port 150. As the first chamber walls 240 buckle or deflect, the top surface 210 can also deflect. Alternatively, when sufficient force is exerted on the top of the top surface 210, only the top surface 210 deflects. In embodiments of the present invention, when sufficient force is exerted on the top of the top surface 210, any combination of the walls 240 and the top surface 210 in any proportion can deflect to cause the force-activated valve element 260 to become compressed and seal the fluid inlet port 140.

The second chamber 190 can be nested over the first chamber 180 and can completely surround the first chamber 180. The perimeter of the second chamber 190 can be bonded to the top or upper surface of the fluid distribution manifold 110 to form a fluid-tight seal. The second chamber 190 can include a rigid top surface 220, and flexible chamber walls 250. The second chamber 190 can also include one or more force-restraining elements (e.g., spring or force-restraining elements) 270, which act between the top surface of the fluid distribution manifold 110 and the top surface 220 of the second chamber sufficient to push the two apart. The second chamber 190 can further enclose a reference pressure port 170. The reference pressure port 170 can provide a connection to a reference pressure that is neither the inlet pressure, nor the outlet pressure. In some examples, the reference pressure port 170 is open to atmospheric pressure.

When a sufficient force is applied to the top surface 220 of the second chamber 190 from the outside, the flexible second chamber walls can be configured to buckle or otherwise deflect causing the one or more spring or force-restraining elements 270, for example, to compress until the top surface 220 comes into contact with the top surface 210 of the first chamber. If the force is of a sufficient magnitude, it can be transmitted through the top surface 220 of the second chamber 190 to the top surface 210 of the first chamber 180, which can cause the first chamber 180 to deform and push the force-activated valve element 260 toward a closed position.

The third chamber 200 can completely surround the second chamber 190 and its perimeter can be bonded to the top or upper surface of the fluid distribution manifold 110 to form a fluid-tight seal. The third chamber 200 can also enclose an output fluid feedback port 160. In some examples, the third chamber walls 230 or any other part of the third chamber can be configured with substantial rigidity to inhibit unwanted force transfer.

In operation, fluid at a high pressure can enter the fluid input conduit 120 and be transported into the first chamber 180 via the input fluid port 140. Under the pressure of the fluid, the first chamber 180 can expand (e.g. deflect) so that the force-activated valve element 260 does not obstruct the fluid path from the input fluid port 140 to the output fluid port 150. This can allow fluid to flow freely from the input fluid port 140 to the output fluid port 150 and into the output fluid conduit 130. As pressure in the output fluid conduit 130 builds, fluid can eventually flow into the third chamber 200 through the output fluid feedback port 160. The accumulation of pressure in the third chamber 200 can result in a force being exerted on the top surface 220 of the second chamber 190. This force can act against the one or more spring or force-restraining members 270 enclosed in the second chamber 190 and eventually cause the second chamber 190 to deflect towards the fluid manifold 110. When this deflection becomes sufficient to cause the top surface 220 of the second chamber 190 to contact the top surface 210 of the first chamber 180, the force-activated valve element 260 can be compressed to form a seal and stop the flow of fluid through the assembly 100.

As fluid is removed from the output fluid conduit 130, the pressure in the third chamber 200 can be decreased, and at some point, the restraining forces of the springs or force-restraining element 270 in the second chamber 190 can cause the second chamber 190 to expand, subsequently allowing the first chamber 180 to expand and for the operation of pressurizing to repeat. For a given flow rate of a fluid, an equilibrium can be established where the pressure in the third chamber 200 stays relatively constant, the force-activated valve 260 stays in approximately the same position, and the output pressure remains relatively constant. When the flow of gas or other fluid is changed, the regulator assembly 100 can automatically adjust to establish a new equilibrium.

The valve 260 can operate in different states. The valve 260 can be closed, wherein the pressure exerted on the area of the top surface 210 of the first chamber 180 enclosed by the sealing perimeter of the valve 260 and the area of the top surface 210 of the first chamber 180 not including the area enclosed by the sealing perimeter of the valve 260 are not necessarily the same. The valve 260 can be open, wherein the pressure exerted on the area of the top surface 210 of the first chamber 180 enclosed by the sealing perimeter of the valve 260 and the area of the top surface 210 of the first chamber 180 not including the area enclosed by the sealing perimeter of the valve 260 are about the same. In between an open and closed state, the valve can be in a virtually infinite variety of partially open states, wherein the pressure exerted on the area of the top surface 210 of the first chamber 180 enclosed by the sealing perimeter of the valve 260 and the area of the top surface 210 of the first chamber 180 not including the area enclosed by the sealing perimeter of the valve 260 are not necessarily the same. Herein, "the area enclosed by the sealing perimeter of the valve 260 refers to the area enclosed within the perimeter of the valve 260 when it is in a closed (sealed) state.

Figure 8:
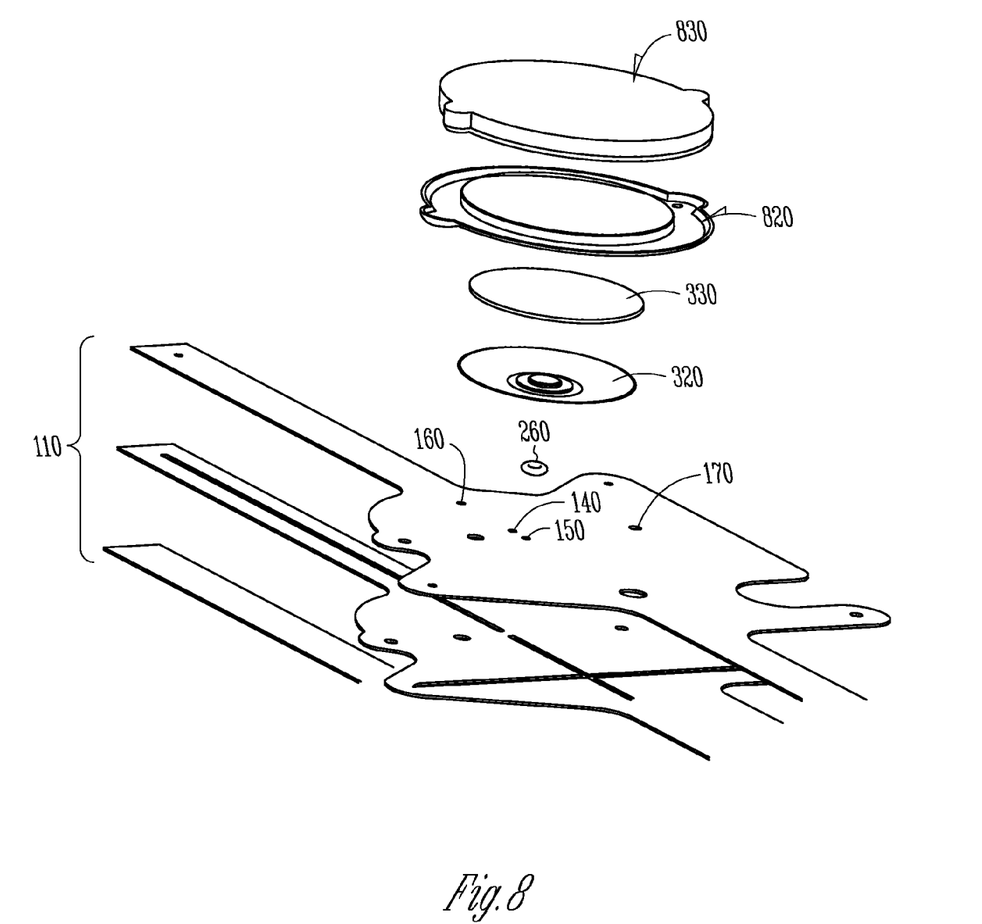
FIG. 8 illustrates an exploded perspective view of portions of a pressure regulator assembly for use in small or micro fluidic applications, as constructed in accordance with at least one embodiment.

The output pressure for a given input pressure obtained with the pressure regulator assembly 100 will be related to the difference between the output and input pressures. The controlled output pressure can increase as the input pressure increases. In some embodiments, the difference between a given input pressure and the corresponding output pressure can be about zero, the input pressure can be greater than the output pressure, or the output pressure can be greater than the input pressure (if for example input pressure decreases or another source of pressure causes output pressure to increase). The spring or force-restraining element forces and forces from the reference pressure in combination with the interplay of the force of the output feedback pressure on the top surface 220 of the second chamber 190 with the force of the input pressure and the pressure in the first chamber 180 on various parts of the top surface 210 of the first chamber 180 determine whether the valve will be in a closed, partially open, or fully open state. By adjusting the area of the top surface 220 of the second chamber 190, the spring constants, the area of the top surface 210 of the first chamber 180 enclosed by the sealing perimeter of the valve 260, and the area of the top surface 210 of the first chamber 180 not including the area enclosed by the sealing perimeter of the valve 260, embodiments of the invention can be made that produce a desired difference between the output and input pressures for particular flow rates and at particular input pressures. One of skill in the art will readily recognize that details of relative size selection of these two chamber tops and the magnitude of the spring constants can be determined using the geometrical interplay disclosed. For example, the area of the top surface 210 of the first chamber 180 can be made small in comparison to the area of the top surface 220 of the second chamber 190. In an example, the area of the top surface 210 of the first chamber 180 not including the area of the sealing perimeter of the valve 260 can be made small compared to the area of the top surface 210 of the first chamber 180 enclosed by the sealing perimeter of the valve 260. In the description of FIG. 8, below, further discussion is given on the interplay of forces within embodiments of the invention.

The pressure regulator assembly 100 does not require pivoting parts or sliding surfaces, and no explicit diaphragm type seals. Instead, one or more chambers can include flexible walls configured to collapse under sufficient externally applied forces. In assembly 100, there is no poppet involved, and no part of the assembly 100 is required to be inserted through a boundary between any two chambers. The valve element 260 does not extend outside the first chamber. The valve element 260 used within the pressure regulator assembly 100 can be predominantly planar, with the forces applied to actuate the valve having a force component orthogonal to the top or bottom of the regulator assembly 100 opposite the valve seat. This relative positioning can simplify the design of the valve arrangement, since, for example, no protrusions through the fluid inlet port 140 are required.

It is expensive and difficult to manufacture poppets and the corresponding valve seats on a small scale. With the present invention, by avoiding the use of poppets and the corresponding valve seats, a smaller pressure regulator valve can be made with lower requirements for precision between the relative positions of various layers of the valve's construction. Also, by avoiding poppets and the corresponding valve seats, embodiments of the pressure regulator can be made to be very thin.

An advantage of the pressure regulator assembly 100 design shown in FIG. 1 is that different materials can be used for different components of the assembly, with minimal, if any, requirements for material compatibility. For instance, the chambers 180, 190, 200 can be made of any material that can be formed to provide a desired stiffness of the chamber tops with the desired flexibility of the chamber walls to allow the chambers to be able to move. As such, chambers can be made of various materials that can be formed to different thicknesses, such as various plastics, including polyesters, polycarbonates, nylon, polyolefin, or other types of engineering plastics, or metals. In some embodiments, for an individual chamber, the chamber tops and walls are not all made of the same material, while in other embodiments, the chamber top and walls include the same material. In some embodiments, the top or walls of one chamber can be made from different materials than the top or walls of another chamber, while in other embodiments, the top of walls of one chamber include the same materials as the top or walls of another chamber.

Figure 4:
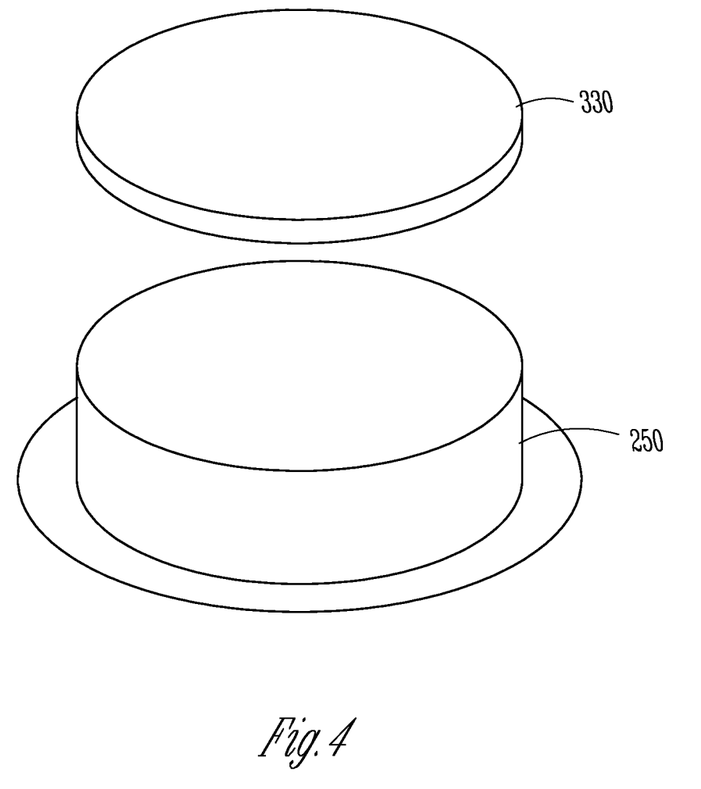
FIG. 4 illustrates a cross-sectional view of portions of a pressure regulator assembly for use in small or micro fluidic applications, as constructed in accordance with at least one embodiment.

If a single material cannot be formed to have the desired combination of rigidity and flexibility, one or more chambers can be formed as a composite structure including more than one material. FIG. 4 illustrates an exploded view of a composite chamber including two different materials. The composite chamber shown in FIG. 4 can fully enclose the first chamber 180, forming the second chamber 190. In this example, the chamber structure has been designed to include flexible sidewalls using a first material 250, and an overall gas or fluid sealing structure when bonded to a fluidic base. Attached to a top or upper surface of the chamber sidewalls is a rigid strengthening member 330 that serves to render the top surface of the chamber rigid and enable a desired function of the chamber. A similar composite structure can be used for the other chambers in the pressure regulator assembly. Suitable materials for stiffening a flexible chamber can include plastics, metals, ceramics, or organic materials such as wood or fiber-board.

In various examples, for a pressure regulator assembly 100 to function as desired, each of its chambers is partially formed by bonding the perimeters of the chamber wall structures to a fluidic base 110. Bonding can be by any suitable means, including the use of adhesives, solvent welding, ultrasonic welding, laser welding, diffusion bonding or any other bonding method that can join a chamber wall material to a fluidic base material. The resulting bond should have sufficient strength to resist the forces due to internal fluidic pressure, sufficient toughness to be durable over a lifetime operation of the assembly, and should form a seal to prevent or inhibit the leakage of the fluid from the regulator assembly 100.

The force-activated valve element 260 used in the pressure regulator assembly 100 can be of various designs. As discussed above, in calculating the expected performance of the assembly 100 (e.g. what the difference in input and output pressures will be at a given input pressure and flow rate), in addition to the spring constants and the reference pressure, it can be the ratio of the dimension of first and second chamber tops 210 and 220 that determine the ratio of outlet pressure to inlet pressure in the regulator 100. However, in other embodiments, the ratio of the second chamber top 220 to the area of the first chamber top 210 enclosed by the sealing perimeter of the valve 260, or the ratio of the second chamber top 220 to the area of the first chamber top 210 not including the area enclosed by the sealing perimeter of the valve 260, can either or both in any proportion, depending on the design of the valve and depending on the design of the other elements of the device, be used to calculate the expected performance of the assembly 100.

Any method of forming a seal over or around the input port 140 can be employed, using compression gaskets, o-rings or other force-activated valve elements. The material used in the valve element 260 should, in various examples, be able to withstand the environment induced by the input fluid (e.g., the valve material should be able to accommodate the pressure, temperature, and other chemical characteristics of the input fluid and still maintain an adequate seal).

In some examples, the springs or other force-restraining elements used in the assembly can provide a restraining force to the top surface 220 of the second chamber 190. By adjusting the spring constant for the one or more springs or force-restraining elements 270, the output pressure needed to cause the second chamber top 220 to displace towards the first chamber top 210 can be adjusted. Other methods of providing a compliant restraining force can also be employed such that the restraining force is roughly uniformly distributed across the second chamber top 220 to support consistent motion of the second chamber 190 when it deflects. Multiple discrete spring or force-restraining members 170 including, for example, small coil springs, compressive foams, elastomeric inserts, etc., may be used. A single spring washer can be also used, particularly for embodiments in which the regulator has radial symmetry. The spring washer can be made of an overall stiff material with features embedded to provide the desired spring properties. A Belleville washer can further be used. In some embodiments, at least some of the walls of a chamber can be made of a material that provides a force-restraining effect to the top surface 200 of the second chamber 190. In one example, at least some of the walls of the second chamber are made of a material that provides a force-restraining effect.

In some examples, the springs or other force-restraining elements 270 can be omitted. In such embodiments, the forces from the reference pressure in combination with the interplay of the force of the output feedback pressure on the top surface 220 of the second chamber 190 with the force of the input pressure and the pressure in the first chamber 180 on various parts of the top surface 210 of the first chamber 180 determine the performance of the apparatus.

The pressure regulator assembly 100 of FIG. 1 can assume various shapes, including circular, irregular, square, polygonal, etc. An overall circular shape of the chambers can be convenient to allow the production of components that are radially symmetric and do not require orientation logistics during assembly. In some examples, however, it can be desirable to provide keyed features or non-circular shapes. In some example, it may be advantageous to modify the shapes of the pressure chambers to achieve additional functionality. For instance, the shape of a chamber can be modified so that the chamber walls act to position or constrain the motion of components within the chamber.

Figure 5:
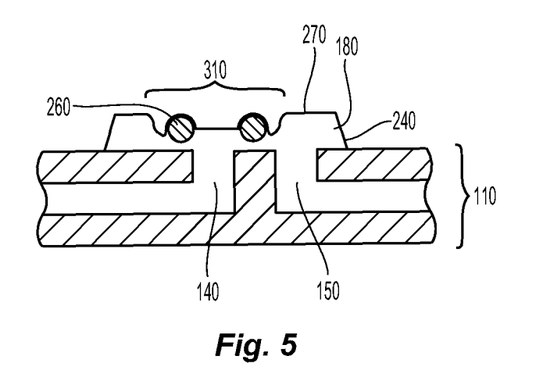
FIG. 5 illustrates a cross-sectional view of portions of a pressure regulator assembly for use in small or micro fluidic applications, as constructed in accordance with at least one embodiment.

FIG. 5 illustrates a cross-sectional schematic view of a first chamber 180 used in a pressure regulator assembly. In this example, as was the case in the example of FIG. 3, a first chamber top 210 is not flat, but has been modified to include a shaped region 310 configured to retain an o-ring force-activated valve element 260. While the example shown in FIG. 5 is for the retention of an o-ring force-activated valve element 260, other modification to the chamber wall or top are possible and can be desirable if different methods of forming a seal are used. The retaining feature for the valve element can be designed to hold the seal away from the manifold surface when flow is allowed, and can also be designed to provide a 'hard stop' to prevent over-compression of the force-activated valve element 260 when the chamber wall deflects excessively.

In addition to modifying the chamber enclosures to retain components, it is also possible to enhance the functionality of a chamber feature to serve an additional function. The pressure regulator assembly design can include three concentric chambers, with the second chamber fully containing the first chamber and an additional spring or force-restraining element. While the spring or force-restraining element can be formed as a discrete component to be mounted within the second chamber, it can also be formed as part of the wall of the first or second chamber, as discussed above.

Figure 6:
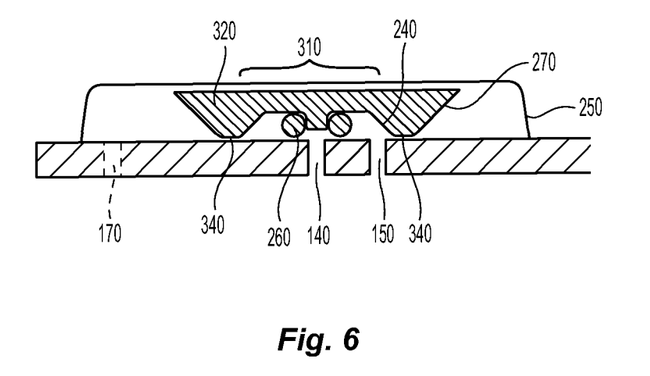
FIG. 6 illustrates a cross-sectional view of portions of a pressure regulator assembly for use in small or micro fluidic applications, as constructed in accordance with at least one embodiment.

FIG. 6 illustrates a cross-sectional schematic of an example of such a configuration, assuming the overall pressure regulator is radially symmetrical. Radial symmetry is not required, but can be convenient for demonstration purposes. In this example, components can be contained within first and second chambers only. An integrated chamber component 320 can be fabricated from a single piece of material in such a manner as to include a Belleville washer feature 270, which can act as a spring when pressed from above, a sealing element retention feature 310, and a first chamber wall 240. In some embodiments, the first chamber can be bonded to a fluidic manifold based at region 340, which can form an annulus around the sealing element and contain the inlet and outlet ports. Due to the optional bonding region 340, motion of the first chamber walls 240 can be independent from motion of the spring element 270. In some embodiments, the optional bonding region 340 is present. In other embodiments, the optional bonding region 340 is not present.

This pressure regulator assembly can be capable of regulating the pressure of fluids including liquids and gases. By virtue of the sealing element material selection, it can be possible to provide a gas tight seal that has no leakage flow, e.g., the regulator can be configured to maintain output pressures at low flow or no flow conditions. In some examples, fluids to be regulated can include any fluid as defined herein. In some embodiments, the pressure regulator can be used in medical applications. In portable power generating applications, the regulator assembly can be used to regulate the pressure and flow of fuel precursors such as solutions of chemical hydrides, or reactants for the generation of hydrogen, including water, alcohols, etc.

Since the pressure regulator assembly is constructed of nested chambers, it can be possible to actuate a valve feature by applying external forces, regardless of the state of the sealing element, inlet and outlet pressures. If a large enough force is applied to the third chamber top from an outside source, for example, then the third chamber can deflect, eventually pressing on the second chamber top, and in turn the first chamber top. The effect of applying this force can be to displace the sealing element to close the path of fluid from inlet to outlet. Accordingly, the pressure regulator assembly has the ability to provide an integrated shut-off valve.

Figure 7:
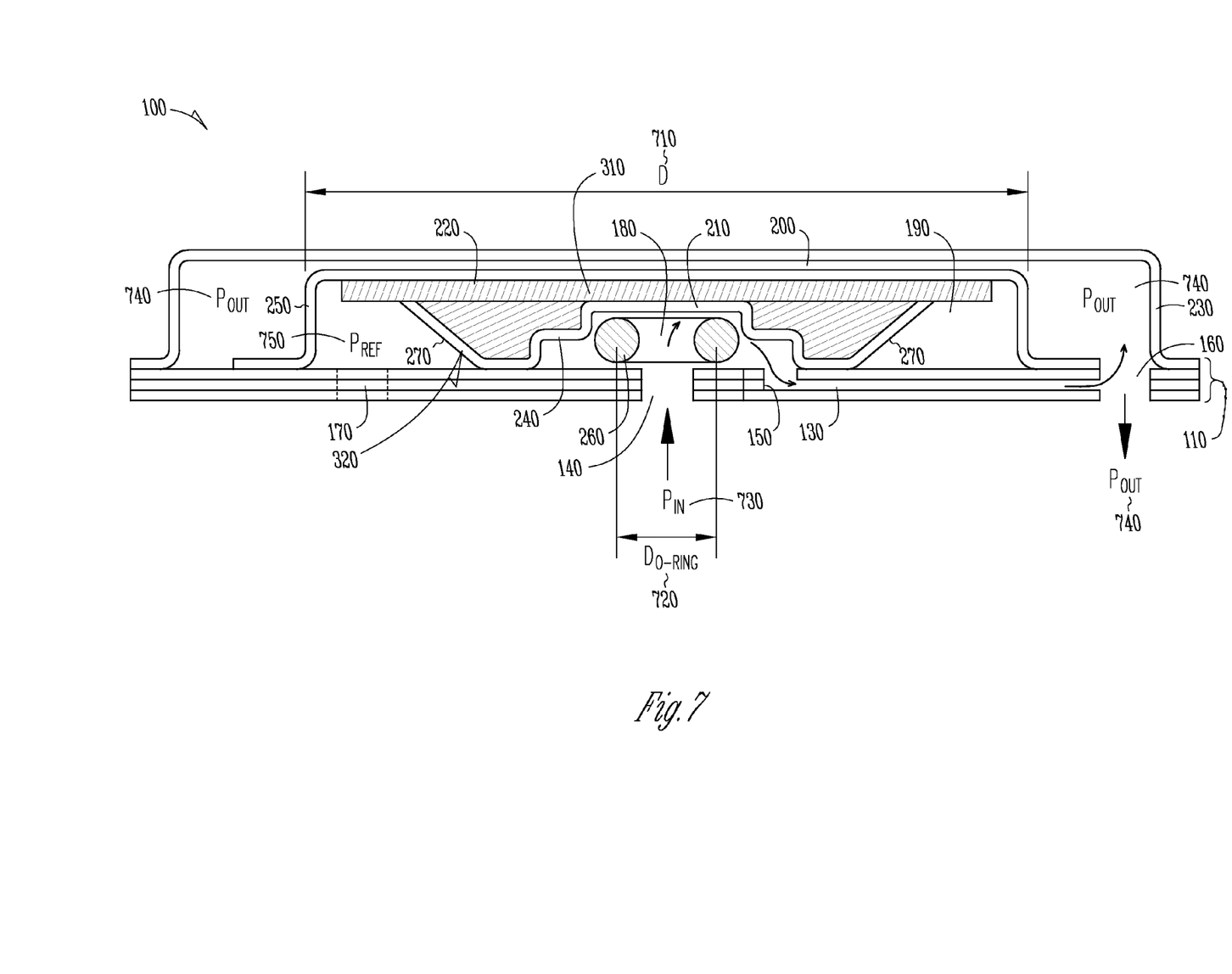
FIG. 7 illustrates a cross-sectional view of a pressure regulator assembly for use in small or micro fluidic applications, as constructed in accordance with at least one embodiment.

FIG. 7 illustrates a schematic cross-sectional view of a radially symmetrical pressure regulator assembly 100, as constructed in accordance with at least one embodiment, similar to the embodiment shown in FIG. 6. FIG. 7 shows conduits and ports that describe the input and output of the regulator assembly 100. Specifically, the fluid manifold 110 can contain a fluid input port 140, and a fluid output conduit 130 connecting to a fluid output port 150 and to an output fluid feedback port 160. These conduits and ports can be built into the fluid distribution manifold 110, which may or may not be included as part of the completed pressure regulator assembly 100.

The pressure regulator assembly 100 can include a first chamber 180, a second chamber 190, and a third chamber 200, arranged on a surface of the fluid distribution manifold 110. The perimeter of the first chamber 180 can be bonded to a top or upper surface of the fluid distribution manifold 110 and can enclose the fluid input port 140 and the fluid output port 150. The bond can form a fluid seal around the perimeter of the first chamber 180.

The second chamber 190 can be nested over the first chamber 180 and can completely surround the first chamber 180. The perimeter of the second chamber 190 can be bonded to the top or upper surface of the fluid distribution manifold 110 to form a fluid-tight seal. The second chamber 190 can include a rigid top surface 220, and flexible chamber walls 250. An integrated chamber component 320 can be fabricated from a single piece of material in such a manner as to include a Belleville washer feature 270, which can act as a spring when pressed from above, a sealing element retention feature 310, and a first chamber wall 240. The second chamber 190 can further enclose a reference pressure port 170. The reference pressure port 170 can provide a connection to a reference pressure that is neither the inlet pressure, nor the outlet pressure. In some examples, the reference pressure port 170 is open to atmospheric pressure.

The third chamber 200 can completely surround the second chamber 190 and its perimeter can be bonded to the top or upper surface of the fluid distribution manifold 110 to form a fluid-tight seal. The third chamber 200 can also enclose an output fluid feedback port 160. In some examples, the third chamber walls 230 can be configured with substantial rigidity to inhibit unwanted force transfer.

In FIG. 7, the variable D, 710, represents the diameter of the top 220 of the second chamber 190. The variable $D_{oring}$, 720, represents the diameter of the sealed perimeter of the valve 260. The variable $P_{in}$, 730, represents the input pressure, and the variable $P_{out}$, 740, represents the output pressure. The variable $P_{ref}$, 750, represents the reference pressure.

In an embodiment such as that shown in FIG. 7, assuming the valve position is determined by the difference between the force exerted on the top 220 of the second chamber 190 and the force exerted by both the restraining element and the force exerted on an area of the top 210 of the first chamber 180 enclosed by the perimeter of the seal of the valve 260, the following is an example of a method to calculate the relationship between the dimensions of various components and the inlet and outlet pressures. Wherein $P_{inmin}$=minimum inlet pressure, $P_{inmax}$=maximum inlet pressure, $P_{outmin}$=minimum allowable outlet pressure, and $P_{outmax}$=maximum allowable outlet pressure, the following equation describes the force relationship:

$$\pi P_{in}\left(\frac{D_{oring}}{2}\right)^2 + F_{spring} = \pi P_{out}\left(\frac{D}{2}\right)^2$$

Therefore, when the output pressure is $P_{outmin}$, for the force exerted on the top of the second chamber by the feedback pressure to be low enough such that at input pressures as low as $P_{inmin}$ the valve can still be opened, D must be sized to satisfy:

$$D \leq 2\left(\frac{1}{\pi P_{outmin}}\left(\pi P_{inmin}\left(\frac{D_{oring}}{2}\right)^2 + F_{spring}\right)\right)^{\frac{1}{2}}.$$

Similarly, when the output pressure is $P_{outmax}$, for the force exerted on the top of the second chamber by the feedback pressure to be high enough such that at input pressures as high as $P_{inmax}$ the valve can still be closed, D must be sized to satisfy:

$$D \geq 2\left(\frac{1}{\pi P_{outmax}}\left(\pi P_{inmax}\left(\frac{D_{oring}}{2}\right)^2 + F_{spring}\right)\right)^{\frac{1}{2}}.$$

The pressure regulator assembly can be made in various sizes. For example, suitable sizes include D as shown in FIG. 7 equal to about 0.01 mm, 0.1 mm, 1 mm, 2 mm, 4 mm, 6 mm, 8 mm, 10 mm, 20 mm, 50 mm, 100 mm, or 200 mm.

EXAMPLE 1

A working embodiment of a pressure regulator can be fabricated from polymer components that are adhesive bonded to a polymeric micro-fluidic base. A small o-ring can be used as a sealing element and can provide a gas tight seal at pressures up to approximately 300 psi. In this example, a first chamber can have a diameter of approximately 2.5 mm, a second chamber can have a diameter of approximately 14 mm, and a third chamber can have a diameter of approximately 18 mm, so that the overall pressure regulator assembly is roughly circular in shape with a diameter of about 18 mm. The third chamber can have a height of <2 mm, with the other two chambers contained within this chamber. All three chambers can be made of polyester, polyester glycol, polycarbonate or acrylic, with the components bonded to the fluidic base using solvent bonding.

An exploded perspective view of the components used to fabricate such a pressure regulator is shown in FIG. 8. This example illustrates a fluidic base 110 with regulator input and output ports 140, 150. Also shown is an ambient pressure reference port 170. An o-ring sealing element 260 can seal around the input port 140 when the regulator is in operation. Enclosing sealing element 260 and the input port 140 and output port 150 can be a composite element 320 as shown in FIG. 6, which includes (not shown in detail in FIG. 8) a first chamber 180, a sealing element retention feature 310 embedded in the first chamber top, and a Belleville washer spring assembly 270. Shown in FIG. 8, a reinforcing member 330 can be added on top of the composition element, to provide rigidity to the top of the second chamber, as described in FIG. 4. Next, a nested component 820 can be placed over the reinforcing member 330 and also enclose the reference pressure port 170, forming the second chamber 190. A nested component 830 can be placed over the second chamber 190, also enclosing a pressure feedback port 160, forming the third chamber 200.

The pressure regulator assemblies shown in FIGS. 3-8 can be assembled by nesting components onto a planar manifold. As such, the regulators can be suitable for manufacturing using pick and place robotics, or through an assembly of large sheets of formed components followed by removing assembled pressure regulators from the bonded sheets. No parts are required to be inserted through or otherwise cross the boundary between chambers, e.g. the force-activated valve element does not extend outside the first chamber. Additionally, each chamber is only in direct fluid communication with a fluidic base. Tolerance concerns for the pressure regulator assemblies of FIGS. 3-8 can be limited to the regulator's components rather than alignment during the assembly process. As a result, lower manufacturing costs can be attained.

Additional Embodiments

The present invention provides for the following exemplary embodiments:

Embodiment 1 provides a pressure regulator assembly including a first chamber configured to enclose a force-activated valve element, a fluidic input port, and a fluidic output port; a second chamber configured to enclose the first chamber, and in communication with a reference pressure port; and a third chamber configured to enclose the second chamber and a feedback input port; wherein the force-activated valve element does not extend outside the first chamber.

Embodiment 2 provides the pressure regulator assembly of embodiment 1, wherein pressure in the third chamber, when above a threshold pressure, results in a force being exerted on the second chamber causing deflection of the second chamber, which in turn causes the first chamber to deflect.

Embodiment 3 provides the pressure regulator assembly of any one of embodiments 1-2, wherein deflection of the first chamber and movement of the force-activated valve element toward or away from a closed state are directly proportional.

Embodiment 4 provides the pressure regulator assembly of any one of embodiments 1-3, wherein sufficient deflection of the first chamber is configured to close the force-activated valve element to impede a flow of fluid from the fluidic input port to the fluidic output port.

Embodiment 5 provides the pressure regulator assembly of embodiment 4, wherein sufficient deflection of the first chamber includes deflection above a threshold deflection.

Embodiment 6 provides the pressure regulator assembly of any one of embodiments 1-5, wherein the fluidic input port and the fluidic output port are co-planar.

Embodiment 7 provides the pressure regulator assembly of any one of embodiments 1-6, wherein the fluidic input port, the fluidic output port, the reference pressure port, and the feedback input port are co-planar.

Embodiment 8 provides the pressure regulator assembly of any one of embodiments 1-7, wherein a mechanical element residing in any one of the first, second or third chambers does not cross into any other chamber.

Embodiment 9 provides the pressure regulator assembly of any one of embodiments 1-8, wherein sufficient pressure formed from a flow of fluid through the feedback input port, in turn, causes the force-activated valve element to move from an open position toward a closed position.

Embodiment 10 provides the pressure regulator assembly of any one of embodiments 1-9, bonded to a multi-port fluidic manifold.

Embodiment 11 provides the pressure regulator assembly of embodiment 10, wherein a flow of fluid between any two chambers is conducted through a path within the fluid manifold.

Embodiment 12 provides the pressure regulator assembly of any one of embodiments 1-11, wherein the first, second and third chambers are configured such that an applied external force that includes a force vector orthogonal to the top of the first chamber and toward the top of the first chamber causes the force-activated valve element to move toward a closed position.

Embodiment 13 provides the pressure regulator assembly of any one of embodiments 1-12, further including a force-restraining element, wherein the force-restraining element exerts a force against deflection of the second chamber.

Embodiment 14 provides the pressure regulator assembly of embodiment 13, wherein the force-restraining element includes a metal coiled spring, Belleville washer, compressive foam, elastic foam, or elastomeric insert.

Embodiment 15 provides the pressure regulator assembly of any one of embodiments 13-14, wherein the second chamber is configured to enclose the at least one force-restraining element.

Embodiment 16 provides the pressure regulator assembly of any one of embodiments 13-15, wherein at least part of the walls of the second chamber include the force-restraining element.

Embodiment 17 provides the pressure regulator assembly of any one of embodiments 13-16, further including a composite element, wherein the composite element includes the first chamber and the force-restraining element.

Embodiment 18 provides the pressure regulator assembly of embodiment 17, wherein the aspect of the composite element that includes the force-restraining element includes a Belleville washer.

Embodiment 19 provides the pressure regulator assembly of any one of embodiments 17-18, wherein the composite element further includes at least part of the walls of the second chamber.

Embodiment 20 provides the pressure regulator assembly of any one of embodiments 1-19, wherein at least one of the first chamber, the second chamber, the third chamber, or the force-activated valve element includes polyester, polyester glycol, polycarbonate, polyolefin, nylon, acrylic, polyvinyl chloride, or metal.

Embodiment 21 provides a system including at least first and second pressure regulator assemblies as recited in any one of embodiments 1-20, wherein the first and second pressure regulator assemblies are arranged in series to reduce an impact of input pressure on output pressure.

Embodiment 22 provides a fuel supply system for a fuel-cell, including the pressure regulator of any one of embodiments 1-21.

Embodiment 23 provides a method of manufacturing a pressure regulator assembly including forming or providing a planar fluidic manifold; forming a plurality of chambers of different sizes; stacking the plurality of chambers in a nested manner on a surface of the planar manifold; and bonding a portion of the chambers to the surface of the planar manifold, to provide the pressure regulator assembly of any one of embodiments 1-22.

Embodiment 24 provides a method of manufacturing a pressure regulator assembly including: forming or providing a planar fluidic manifold with a fluidic input port, a fluidic output port, a reference pressure port, and a feedback input port; forming a first chamber, a second chamber, and a third chamber; placing the first chamber on the manifold, such that it encloses a force-activated valve element, the fluidic input port, and the fluidic output port; stacking the second chamber on the manifold, such that it encloses the first chamber and is in communication with the reference pressure port; stacking the third chamber on the manifold, such that it encloses the second chamber and the feedback input port; and, bonding a portion of the chambers to the surface of the planar manifold.

Embodiment 25 provides the method of any one of embodiments 23-24, wherein a material property of a first chamber is different than a material property of a second chamber or a third chamber.

Embodiment 26 provides the method of any one of embodiments 23-25, wherein forming the plurality of chambers at least partially includes a thermoforming process.

Embodiment 27 provides a pressure regulator assembly including a first chamber configured to enclose a force-activated valve element, a fluidic input port, and a fluidic output port; a second chamber configured to enclose the first chamber, and in communication with a reference pressure port; a third chamber configured to enclose the second chamber and a feedback input port; a force-restraining element, wherein the force-restraining element exerts a force against deflection of the second chamber; and, a composite element, wherein the composite element includes the first chamber and the force-restraining element; wherein pressure in the third chamber, when above a threshold pressure, results in a force being exerted on the second chamber causing deflection of the second chamber, which in turn causes the first chamber to deflect, wherein sufficient deflection of the first chamber is configured to close the force-activated valve element to impede a flow of fluid from the fluidic input port to the fluidic output port, wherein sufficient pressure formed from a flow of fluid through the feedback input port, in turn, causes the force-activated valve element to move from an open position toward a closed position, wherein the composite element further includes at least part of the walls of the second chamber.

Embodiment 28 provides the pressure regulator assembly or method of any one or any combination of Embodiments 1-27 is optionally configured such that all elements or options recited are available to use or select from.

Additional Notes

The above Detailed Description includes references to the accompanying drawings, which form a part of the Detailed Description. The drawings show, by way of illustration, specific embodiments in which the invention can be practiced. These embodiments are also referred to herein as "examples." The examples can include elements in addition to those shown or described, such as one or both of a pressure relief device or a thermal relief device. However, the present inventor also contemplates examples in which only those elements shown or described are provided. Moreover, the present inventor contemplates examples using any combination or permutation of those elements shown or described (or one or more aspects thereof), either with respect to a particular example (or one or more aspects thereof), or with respect to other examples (or one or more aspects thereof) shown or described herein.

All publications, patents and patent documents referred to in this document are incorporated by reference herein in their entirety, as though individually incorporated by reference. In the event of inconsistent usages between this document and those documents so incorporated by reference, the usage in the incorporated references should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "top," "bottom," "inward," "outward," and the like are for purposes of understanding and reference; these terms are not intended to be limiting.

In the appended claims, the terms "including" and "in which" are used as the plain-English equivalents of the respective terms "comprising" and "wherein." Also, in the following claims, the terms "including" and "comprising" are open-ended, that is, a system, propellable apparatus, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. §1.72(b), to allow the reader to quickly ascertain the nature of the technical disclosure. It is submitted with the understanding that it will not be used to interpret or limit the scope or meaning of the claims.

The following claims are hereby incorporated into the Detailed Description, with each claim standing on its own as a separate embodiment. The scope of the invention should be determined with reference to the appended claims, along with the full scope of equivalents to which such claims are entitled.

What is claimed:

1. A pressure regulator assembly comprising:
   a first chamber having a first surface, a side surface, a fluidic input port, and a fluidic output port, wherein the first chamber encloses a force-activated valve element;
   a second chamber configured to enclose the first and side surfaces of the first chamber, and in communication with a reference pressure port; and
   a third chamber configured to enclose the second chamber and that is in fluidic communication with a feedback input port in fluidic communication with the fluidic output port;
   wherein the force-activated valve element does not extend outside the first chamber.

2. The pressure regulator assembly of claim 1, wherein pressure in the third chamber, when above a threshold pressure, results in a force being exerted on the second chamber causing deflection of the second chamber, which in turn causes the first chamber to deflect.

3. The pressure regulator assembly of claim 1, wherein deflection of the first chamber and movement of the force-activated valve element toward or away from a closed state are directly proportional.

4. The pressure regulator assembly of claim 1, wherein a deflection of the first chamber above a threshold deflection is configured to close the force-activated valve element in order to impede a flow of fluid from the fluidic input port to the fluidic output port.

5. The pressure regulator assembly of claim 1, wherein the fluidic input port and the fluidic output port are co-planar.

6. The pressure regulator assembly of claim 1, wherein the fluidic input port, the fluidic output port, the reference pressure port, and the feedback input port are co-planar.

7. The pressure regulator assembly of claim 1, wherein a mechanical element residing in any one of the first, second or third chambers does not cross into any other chamber.

8. The pressure regulator assembly of claim 1, wherein a pressure from a flow of fluid through the fluidic output port and communicated to the third chamber through the feedback input port, in turn, causes the force-activated valve element to move from an open position toward a closed position.

9. The pressure regulator assembly of claim 1, wherein the first, second and third chambers are configured such that an applied external force that includes a force vector orthogonal to the top of the first chamber and toward the top of the first chamber causes the force-activated valve element to move toward a closed position.

10. The pressure regulator of claim 1, wherein the side surface of the first chamber is flexible.

11. The pressure regulator of claim 1, wherein the second chamber comprises a second surface and a second side surface and the third chamber is configured to enclose the second surface and the second side surface.

12. The pressure regulator of claim 11, wherein the second side surface of the second chamber is flexible.

13. The pressure regulator assembly of claim 1, bonded to a multi-port fluidic manifold.

14. The pressure regulator assembly of claim 13, wherein a flow of fluid between any two chambers is conducted through a path within the fluid manifold.

15. The pressure regulator assembly of claim 1, further comprising a force-restraining element, wherein the force-restraining element exerts a force against deflection of the second chamber.

16. The pressure regulator assembly of claim 15, wherein the force-restraining element comprises a metal coiled spring, Belleville washer, compressive foam, elastic foam, or elastomeric insert.

17. The pressure regulator assembly of claim 15, wherein the second chamber is configured to enclose the at least one force-restraining element.

18. The pressure regulator assembly of claim 15, wherein at least part of the walls of the second chamber comprise the force-restraining element.

19. The pressure regulator assembly of claim 15, further comprising a composite element, wherein the composite element comprises a wall of the first chamber and the force-restraining element.

20. The pressure regulator assembly of claim 19, wherein the force-restraining element comprises a Belleville washer.

21. The pressure regulator assembly of claim 19, wherein the composite element further comprises at least part of the walls of the second chamber.

22. A pressure regulator assembly comprising:
  a first chamber comprising a sealing member, a fluidic input port, and a fluidic output port;
  a second chamber separated from the first chamber by a first moveable surface, and in communication with a reference pressure port; and
  a third chamber separated from the second chamber by a second moveable surface, wherein the third chamber is in fluidic communication with the fluidic output port through a feedback port;
  wherein a pressure in the third chamber, when above a threshold pressure, results in a force moving the second moveable surface to contact and to push the first moveable surface to cause the sealing member to impede a flow of fluid from the fluidic input port to the fluidic output port.

23. The pressure regulator assembly of claim 22, wherein the sealing member comprises an o-ring.

24. The pressure regulator assembly of claim 22, wherein the first moveable member comprises a non-flat region configured to retain the sealing member when the first moveable member is in the second configuration.

25. The pressure regulator assembly of claim 22, wherein the first moveable surface comprises a flexible surface.

26. The pressure regulator assembly of claim 25, wherein the second moveable surface comprises a rigid surface.

27. The pressure regulator assembly of claim 26, wherein the rigid surface is biased to a position where the second chamber is undeflected.

* * * * *